United States Patent
Drullinger

(10) Patent No.: US 12,107,709 B1
(45) Date of Patent: Oct. 1, 2024

(54) TIMING SYNCHRONIZATION IN PULSE POSITION MODULATION (PPM) MODEMS

(71) Applicant: SA Photonics, Inc., Los Gatos, CA (US)

(72) Inventor: Todd Matthew Drullinger, Redwood City, CA (US)

(73) Assignee: SA PHOTONICS, INC., Los Gatos, CA (US)

( * ) Notice: Subject to any disclaimer, the term of this patent is extended or adjusted under 35 U.S.C. 154(b) by 217 days.

(21) Appl. No.: 17/581,510

(22) Filed: Jan. 21, 2022

Related U.S. Application Data

(60) Provisional application No. 63/166,184, filed on Mar. 25, 2021.

(51) Int. Cl.
*H04B 10/11* (2013.01)
*H04L 25/49* (2006.01)

(52) U.S. Cl.
CPC .......... *H04L 25/4902* (2013.01); *H04B 10/11* (2013.01)

(58) Field of Classification Search
CPC ............................ H04L 25/4907; H04B 10/11
See application file for complete search history.

(56) References Cited

U.S. PATENT DOCUMENTS

| | | | | |
|---|---|---|---|---|
| 3,226,644 A * | 12/1965 | Wiggins | .................. | H04B 7/12 375/267 |
| 4,648,133 A * | 3/1987 | Vilnrotter | ............. | H04L 7/0066 398/154 |
| 6,246,738 B1 * | 6/2001 | Acimovic | ............ | H03D 13/001 375/240.03 |
| 6,292,051 B1 * | 9/2001 | Su | ....................... | H04L 25/4902 329/313 |
| 6,625,231 B1 * | 9/2003 | Shen | ....................... | H04L 27/22 375/279 |
| 6,700,931 B1 * | 3/2004 | Lee | ...................... | H04L 25/4902 329/313 |
| 7,920,663 B1 * | 4/2011 | Stevens | ................... | H03L 7/085 713/400 |
| 8,768,169 B2 * | 7/2014 | Yuan | ..................... | H04J 3/0667 398/72 |

(Continued)

OTHER PUBLICATIONS

Hargrave, Frank. "Pulse Position Modulation (PPM)." In Hargrave's Communications Dictionary, Wiley. Wiley, 2001. Accessed Oct. 19, 2023. https://search.credoreference.com/articles/Qm9va0FydGljbGU6MTQ20DkzNQ ==?aid=279753.*

*Primary Examiner* — Tanya T Motsinger
(74) *Attorney, Agent, or Firm* — BakerHostetler

(57) ABSTRACT

A PPM-modulated signal is based on a format comprising (i) N data slots per symbol period, (ii) guard slots separating the data slots, and (iii) the symbols are encoded by the position of pulses within the data slots. Timing synchronization of the receiver to an incoming PPM-modulated signal is achieved as follows. The incoming PPM-modulated signal is processed to generate slot detection signals, which are indicative of a presence of a pulse in a corresponding one of the N data slots. A timing correction signal is generated based on a difference between (a) accumulated slot detection signals for receiver data slot 1, and (b) accumulated slot detection signals for receiver data slot N. Timing of the receiver is adjusted based on the timing correction signal.

20 Claims, 13 Drawing Sheets

(56) References Cited

U.S. PATENT DOCUMENTS

| | | | |
|---|---|---|---|
| 8,976,837 B1* | 3/2015 | Lomp | H04B 14/026 |
| | | | 375/135 |
| 10,491,309 B1* | 11/2019 | Rao | H04B 10/80 |
| 2001/0001616 A1* | 5/2001 | Rakib | H04L 1/006 |
| | | | 375/259 |
| 2002/0176486 A1* | 11/2002 | Okubo | H04B 1/707 |
| | | | 375/E1.002 |
| 2009/0147806 A1* | 6/2009 | Brueckheimer | H04J 3/0667 |
| | | | 370/503 |
| 2017/0257173 A1* | 9/2017 | Harris | H04B 10/07953 |
| 2019/0212002 A1* | 7/2019 | Jonsson | G02B 13/146 |
| 2020/0041870 A1* | 2/2020 | Protopopov | H01S 3/0092 |
| 2020/0192413 A1* | 6/2020 | Yang | H03L 7/099 |
| 2020/0264047 A1* | 8/2020 | Coward | G01J 3/2823 |
| 2020/0271746 A1* | 8/2020 | Mason | G01S 1/022 |
| 2022/0244338 A1* | 8/2022 | Peterson | G01S 1/245 |
| 2022/0244340 A1* | 8/2022 | Peterson | G01S 1/24 |

\* cited by examiner

TIMING SYNCHRONIZATION IN PULSE POSITION MODULATION (PPM) MODEMS

CROSS-REFERENCE TO RELATED APPLICATION(S)

This application claims priority under 35 U.S.C. § 119(e) to U.S. Provisional Patent Application Ser. No. 63/166,184, "Blind Slot and Symbol Synchronization in Pulse Position Modulation (PPM) Modems," filed Mar. 25, 2021. The subject matter of all of the foregoing is incorporated herein by reference in its entirety.

GOVERNMENT RIGHTS LEGEND

This invention was made with government support under contract FA9453-20-C-0532 awarded by the United States Air Force. The government has certain rights in the invention.

BACKGROUND

1. Technical Field

This disclosure relates generally to pulse-position-modulation (PPM), for example as may be used in free space communications.

2. Description of Related Art

Pulse-position modulation (PPM) is a method of encoding information on a carrier signal. PPM may be used in free space communications, as well as other applications. In PPM, symbols are transmitted by sending a pulse at some point during a time interval allocated to the symbol (the symbol period). The symbol is coded by the pulse's position within the symbol period. Typically, the symbol period is divided into equal width time slots, and the symbol is coded by which time slot is occupied by the pulse.

In order for a receiver to recover data from a PPM-modulated signal, the receiver is time synchronized with the received PPM-modulated signal. For example, it may recover both the symbol timing and the pulse timing, for example the temporal locations of the boundaries between adjacent symbols and the temporal locations of the different time slots within a symbol period.

This timing can be synchronized outside the PPM-modulated signal itself. For example, the transmitter (TX) and receiver (RX) may both reference a common time source. However, achieving external synchronization to the required accuracy can be impractical or expensive for many applications. In another approach, timing information may be transmitted from the TX to RX by a channel separate from the PPM-modulated signal. However, this requires a separate communications channel, which adds expense and complexity. In addition, even if the TX and RX are time synchronized, the received PPM-modulated signal may be temporally offset relative to the RX timing, for example due to propagation delay from the TX to the RX.

Thus, there is a need for approaches to synchronize the RX and the PPM-modulated signal received at the RX by recovering timing information from the PPM-modulated signal itself.

SUMMARY

Embodiments relate to a pulse position modulation (PPM) receiver for recovering symbols from an incoming PPM-modulated signal. The PPM-modulated signal is based on a format comprising (i) symbol periods with N data slots per symbol period, (ii) guard slots separating the data slots of different symbol periods, and (iii) the symbols are encoded by the position of pulses within the data slots. The PPM receiver includes a local timing source, a PPM slot detection module and a feedback path. The PPM slot detection module receives the incoming PPM-modulated signal and outputs slot detection signals. Each slot detection signal is indicative of a presence of a pulse in a corresponding one of the N data slots. Timing of the PPM slot detection module, including the temporal location of the N data slots, is determined by a local timing signal produced by the local timing source. The feedback path adjusts a timing of the local timing signal to synchronize the receiver with the received signal. For example, the feedback path generates a timing correction signal that is based on a difference between (a) accumulated slot detection signals for receiver data slot 1, and (b) accumulated slot detection signals for receiver data slot N. The slot detection signals are accumulated over many symbol periods.

Other aspects include components, devices, systems, improvements, methods, processes, applications, computer readable mediums, and other technologies related to any of the above.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Various embodiments will be described in the context of a free space optical communications link using pulse position modulation (PPM), but the technologies described may be used with any PPM-modulated signals and any types of medium, including RF links, fiber coupled optical links, wired links, and acoustic links.

Figure 1A:
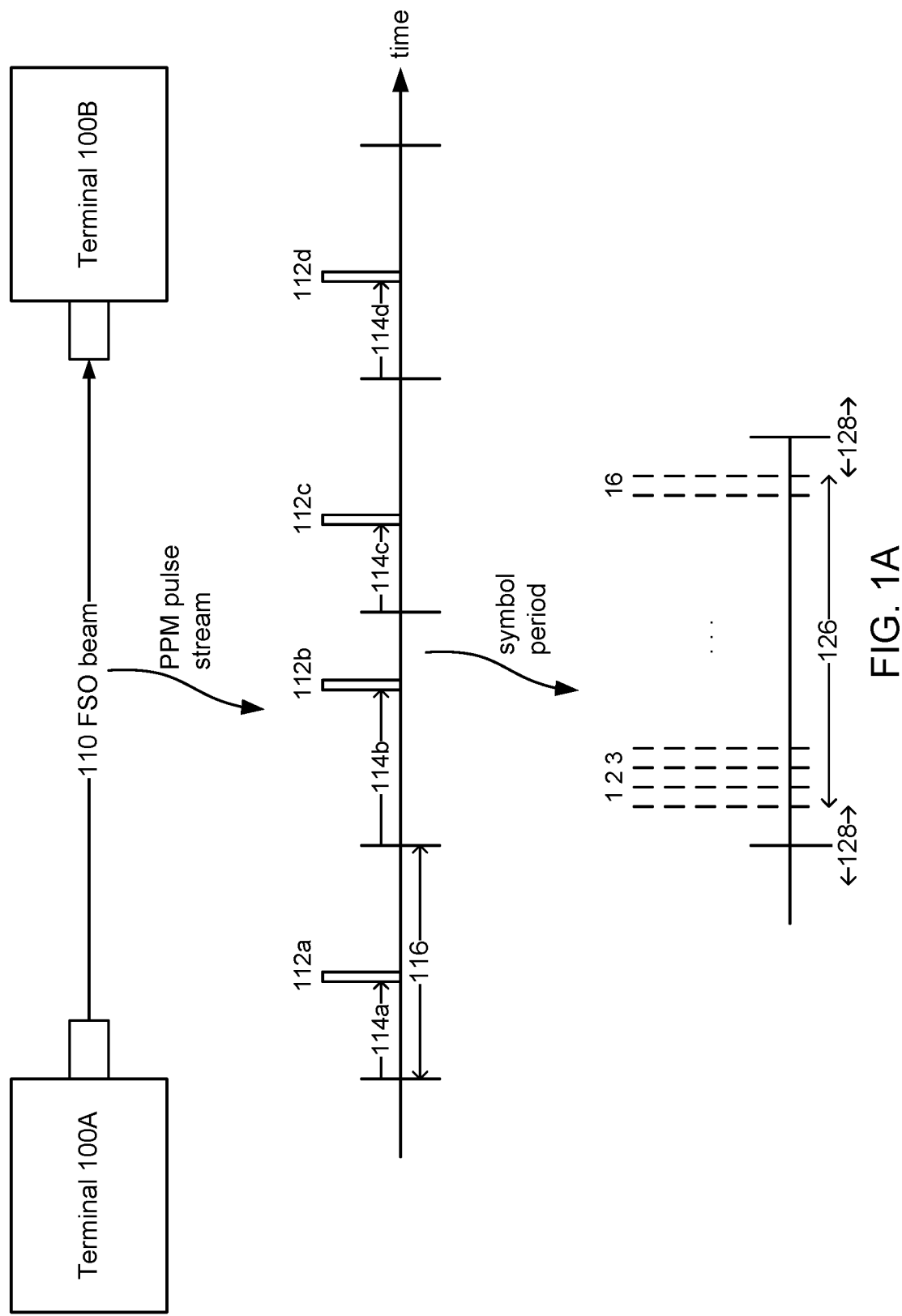
FIG. 1A is a block diagram of two terminals communicating via a free space optical communications link using pulse position modulation (PPM), according to some embodiments.

FIG. 1 is a block diagram of two terminals communicating via a free space optical communications link using pulse position modulation (PPM), according to some embodiments. Terminal 100A is the transmitter terminal (TX) and terminal 100B is the receiver terminal (RX). FIG. 1 shows only one FSO communications link from terminal 100A to terminal 100B, but the communication may also be bidirectional using an FSO communication link in the other direction. The FSO communication link uses unguided waves 110 traveling through free space to transmit data. Free space can include the atmosphere, outer space, vacuum, and water, for example. The terminals may be ground-based, mobile, air- or sea-borne or satellite-based, for example.

In FIG. 1, the TX terminal 100A generates and transmits and FSO beam 110 to the RX terminal 100B. The FSO beam 110 is an optical beam encoded with data. Wavelengths for the FSO beam may include those commonly used in telecom around 1500 nm, for example. FSO links may be used where physical connections are impractical due to high costs or other considerations. In addition, compared to other electromagnetic communications means, the FSO beams 110 transmitted from the TX terminal to the RX terminal are more directional. The directionality provides advantages for communications capacity, power consumption and communications privacy. For example, PPM may be used to extend the range of an FSO link because it enables longer links for a given amount of transmit power. PPM may be used for extremely long links, such as to the moon or to Mars or from LEO orbit to GEO orbit. PPM waveforms also have low DC content, which makes it useful in some applications to ensure transitions.

Pulse position modulation is used to encode the data onto the FSO beam 110 as a stream of pulses. The middle part of FIG. 1 shows the structure of the pulse stream. Symbols are transmitted by sending a pulse 112$x$ (where x=a, b, c, etc.) at some point during a time interval allocated to the symbol (the symbol period 116). The TX terminal 100A encodes the symbol by the pulse's temporal position 114$x$ within the symbol period 116. The RX terminal 100B then receives the FSO beam 110 and determines the position 114$x$ of each pulse 112$x$ within the symbol periods 116 in order to recover the data from the FSO beam. FIG. 1 shows four symbol periods 116, each with one pulse 112$x$ that encodes one symbol per symbol period.

In many PPM frameworks, the symbol period 116 is divided into equal width time slots, as shown in the bottom part of FIG. 1. Some of the time slots are "data slots" 126 where pulses 112 may be located, and some of the time slots are "guard slots" 128 where pulses are not permitted. FIG. 1 shows this structure, using an example of N data slots (N=16 in this example) and 4 guard slots for a total of 20 time slots per symbol period. The data slots are denoted by the dashed lines. The boundary of the symbol period 116 is located within the guard slots 128.

The RX terminal 100B determines which data slot 126 contains the pulse 112 and then determines the symbol transmitted based on which data slot contained the pulse. In order to recover data from the PPM-encoded beam, the RX terminal 100B is synchronized to the received beam 110. That is, the RX terminal determines the temporal location of the data slots 126 within the received beam 110. If there is a timing offset between the RX terminal 100B and the received beam 110, then data recovery may be degraded or even corrupted. For example, if data slot 1 in the received beam 110 starts at time to but the RX terminal 110B thinks that it starts at time t0+Δ where Δ is small (less than the width of the pulse), then there may be some signal degradation in the data recovery process. If Δ is larger, for example if the RX terminal 110B thinks that data slot 1 starts at time t2, which is actually the start of data slot 3 in the received beam 110, then there may be errors in symbol recovery.

For convenience, "receiver data slots" will be used to refer to the temporal locations of the data slots according to the RX terminal 110B, and "signal data slots" will be used to refer to actual temporal locations of the data slots (or pulses) in the received PPM-modulated signal. Timing recovery or timing synchronization attempts to reduce the timing offset between the receiver data slots and the signal data slots (or received pulses). Note that the signal data slots refers to the timing of the PPM-modulated signal as received by the RX terminal 110B, not as transmitted by the TX terminal 110A, because there may be a delay due to propagation between the terminals and/or processing at the terminals.

Figure 1B:
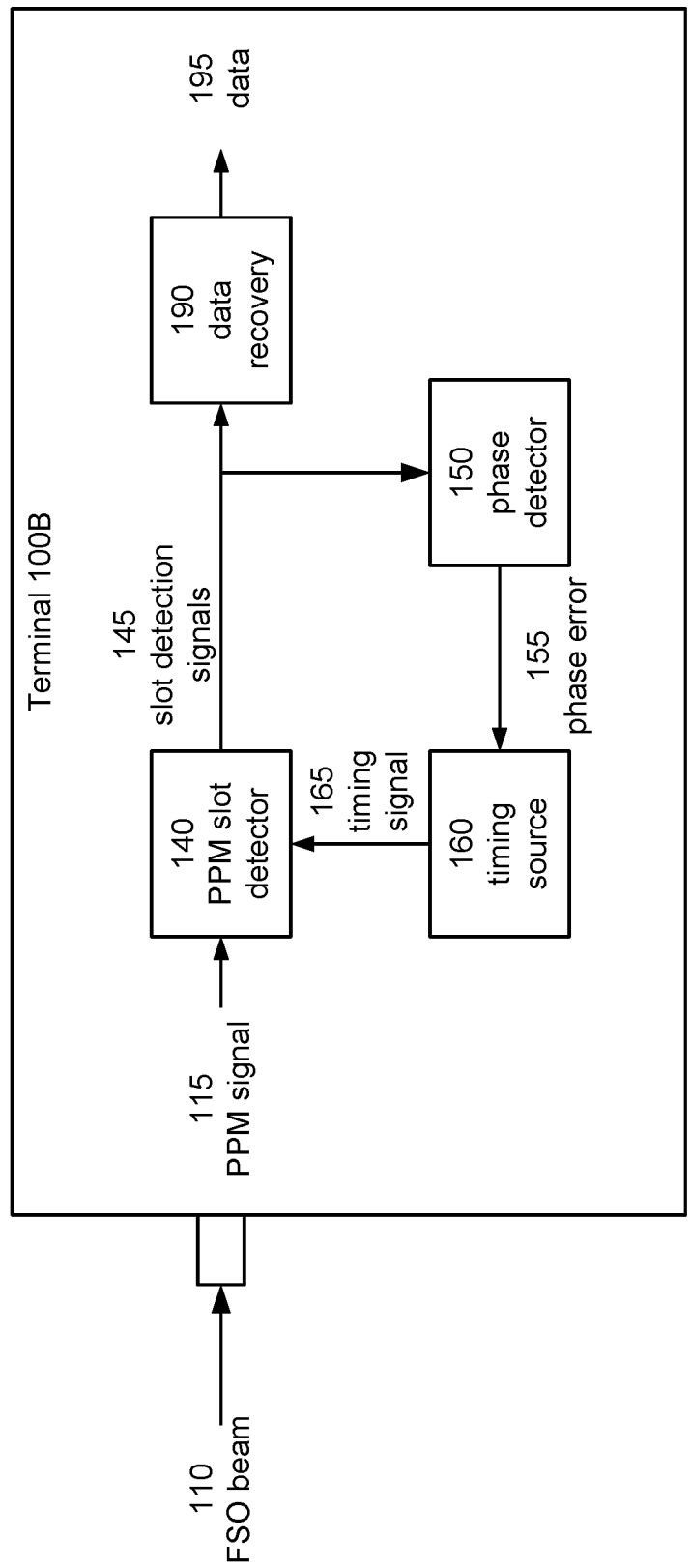
FIG. 1B is a block diagram of a PPM receiver within a receiver terminal, according to some embodiments.

Coarse timing synchronization may be implemented using conventional techniques, for example by sweeping the frequency of a local oscillator at the RX terminal 110B. This coarse timing synchronization will reduce the timing offset sufficiently to enable the finer synchronization techniques described herein. In FIG. 1B, the block diagram within the RX terminal 110B shows one embodiment of this fine synchronization. The FSO beam 110 is received and processed to produce a PPM-modulated signal 115. A PPM slot detection module 140 receives the incoming PPM-modulated signal 115 and outputs N slot detection signals 145 per symbol period, one for each data slot. Each slot detection signal 145 is an indication of whether a pulse is located in the corresponding receiver data slot. Slot detection signal 1 is a measure of whether the pulse is located in receiver data slot 1, slot detection signal 2 is a measure of whether the pulse is located in receiver data slot 2, and so on up to slot detection signal N is a measure of whether the pulse is located in receiver data slot N.

These slot detection signals 145 will depend on the temporal location of the receiver data slots. A local timing source 160 generates a local timing signal 165, which provides the timing that determines the temporal location of the receiver data slots. A feedback path includes a phase detector 150, which produces a phase error signal 155. This is used as a timing correction signal to adjust the local timing signal 165 to reduce the timing offset (phase error) between the PPM slot detection module 140 and the PPM-modulated signal 115.

The phase detector 150 accumulates the slot detection signals for receiver data slot 1 and for receiver data slot N. The resulting phase error signal 155 is based on the difference between these accumulated slot detection signals. Because data slot 1 and data slot N border guard slots, a timing offset will reduce the slot detection signal 145 for either data slot 1 or data slot N, depending on the direction of the timing offset. The difference between the two is then an indication of the timing offset. The slot detection signals are accumulated over multiple symbol periods in order to get a sufficient sample size of the slot detection signals.

The slot detection signals 145 represent the transmitted symbols. They are also used by data recovery module 190 to recover the data 195 from the encoded symbols.

Figure 2:
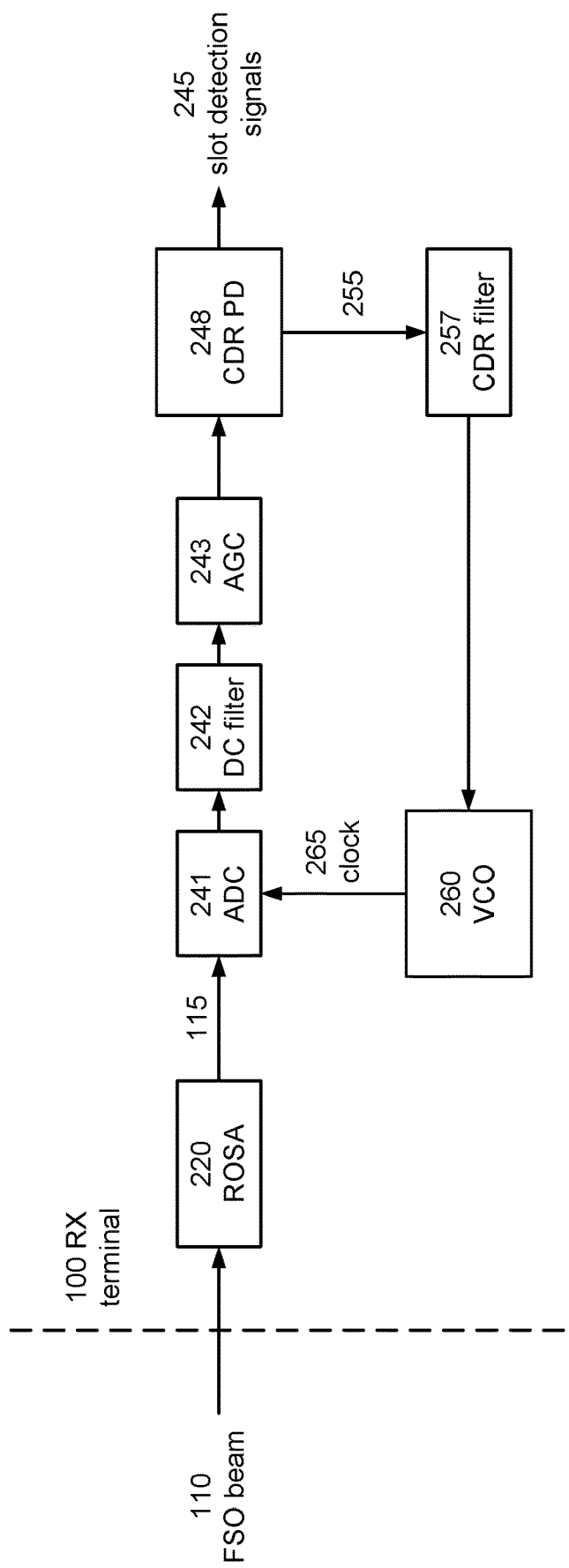
FIG. 2 is a block diagram of a receiver terminal, according to some embodiments.

FIG. 2 is a more detailed block diagram of a receiver, according to some embodiments. The data path is the following. The incoming optical beam 110 is coupled to a receiver optical sub assembly 220, which converts the signal from optical to electrical form. An A/D converter 241 samples the PPM electrical signal 115, converting it from analog to digital form. The timing of the sampling is driven by a local clock 265 produced by voltage controlled oscillator 260. The digital signal is conditioned, in this example by removing the DC component 242 and applying automatic gain control 243. The conditioned PPM-modulated signal is input to a clock and data recovery phase detector (CDR PD) 248. The CDR PD processes the incoming PPM-modulated signal and produces the slot detection signals 245, which are further processed to recover the symbols.

On the timing loop, the CDR PD 248 also produces the phase error signal 255, which is the difference between the accumulated slot detection signals for data slots 1 and N. This is conditioned, in this example by low pass filtering 257. The resulting timing correction signal is a measure of the timing offset and is also a measure of the phase error between the local clock 265 and the incoming PPM-modulated signal 115. That is, component 248 also operates as a phase detector. The phase error is used to control the VCO 260.

Figure 3:
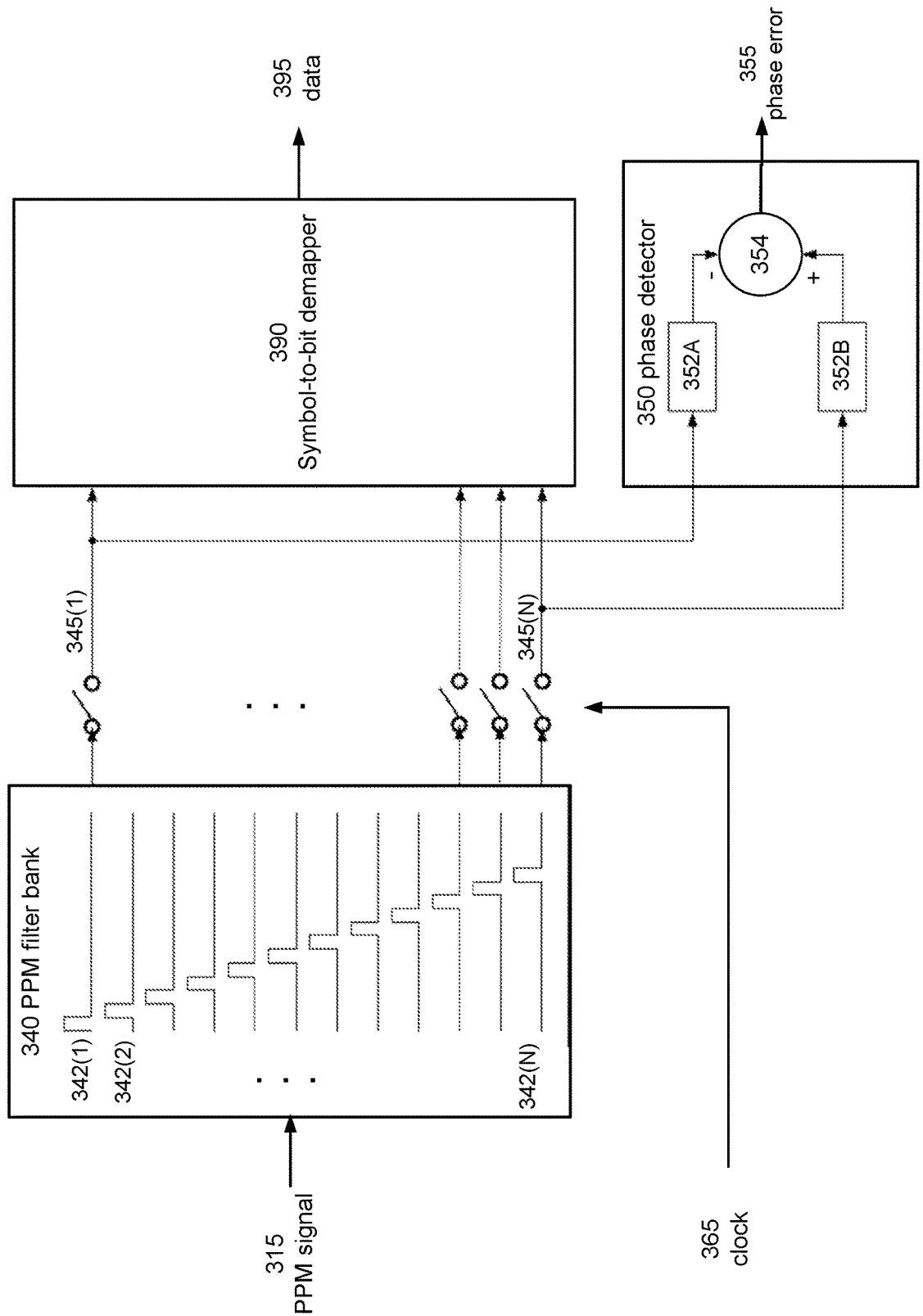
FIG. 3 is a block diagram of an embodiment that uses a PPM filter bank, according to some embodiments.

FIG. 3 is a block diagram of an embodiment that uses a PPM filter bank, according to some embodiments. The portion of the receiver shown in FIG. 3 includes a PPM filter bank 340, a phase detector 350, and a symbol-to-bit demapper 390. In the data path, the PPM filter bank 340 receives the incoming PPM-modulated signal 315 and outputs the slot detection signals 345, one for each receiver data slot. The demapper 390 receives the slot detection signals 345 and converts them to a bit stream 395.

In more detail, the PPM filter bank 340 includes N temporal filters 342(1)-(N) that are used to detect whether a received pulse occupies the corresponding receiver data slot. These will be referred to as PPM position filters 342. The incoming PPM-modulated signal 315 is filtered by each of the position filters 342 to generate the corresponding slot detection signal 345. As one example, the PPM position filters 342 may be step functions that integrate the input signal 315 over the relevant time period for that receiver data slot. If the pulse has a certain shape, the position filters 342 may be matched filters. The temporal location of the PPM position filters 342 is determined by the local clock 365.

The feedback path in FIG. 3 includes a phase detector 350. The phase detector 350 includes two accumulators 352A and 352B, and a difference component 354. Accumulator 352A accumulates the slot detection signals 345(1) for receiver data slot 1, and accumulator 352B accumulates the slot detection signals 345(N) for receiver data slot N. These are the two data slots that border the guard slots. The difference component 354 generates the difference between these two accumulated slot detection signals, which is an indication of the phase error. The implementation shown in FIG. 3 operates as a phase detector, as described in FIGS. 4A-4C.

Figure 4A:
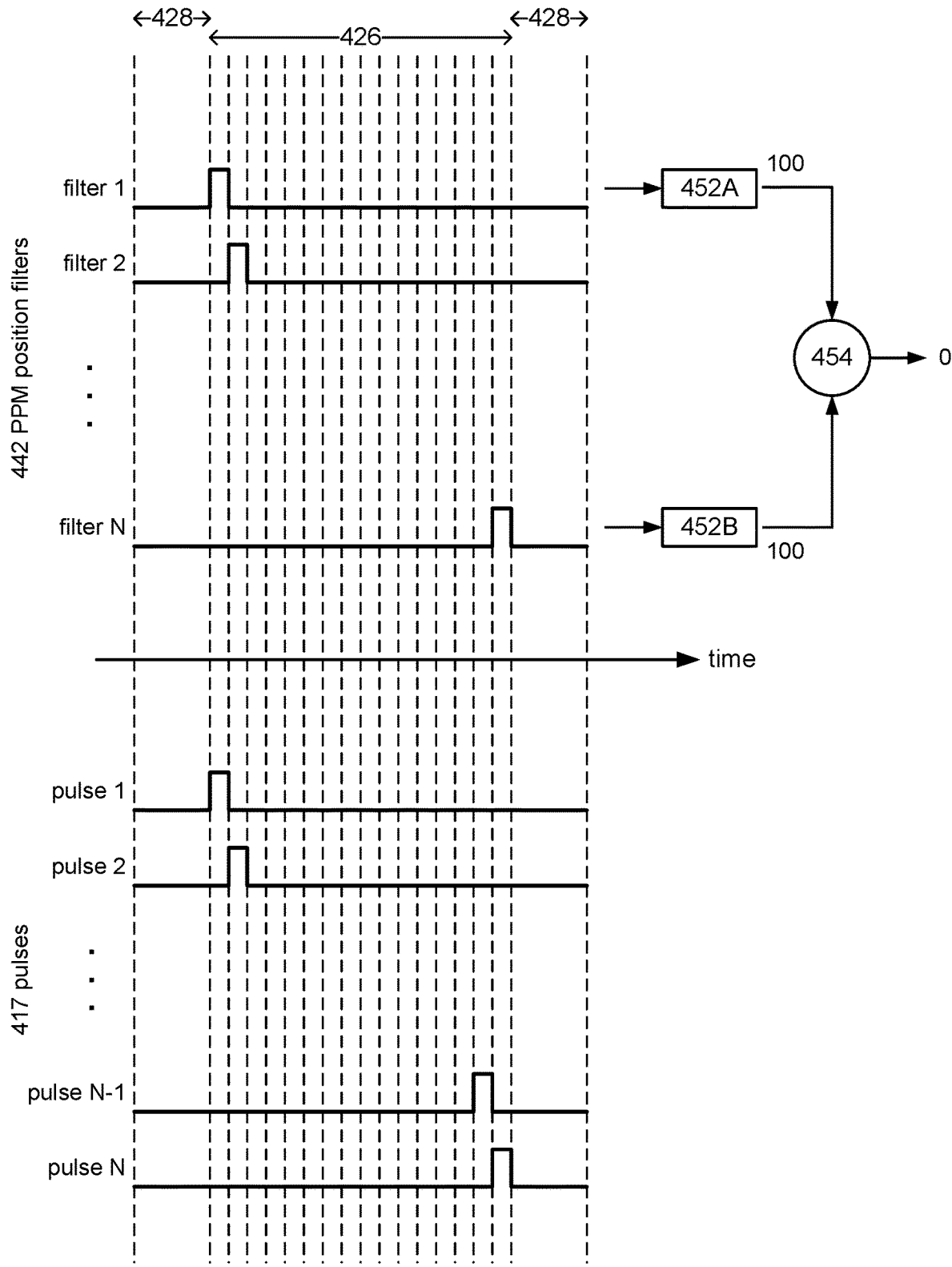
FIGS. 4A-4C are timing diagrams that illustrate timing synchronization using the PPM filter bank of FIG. 3.
Figure 4B:
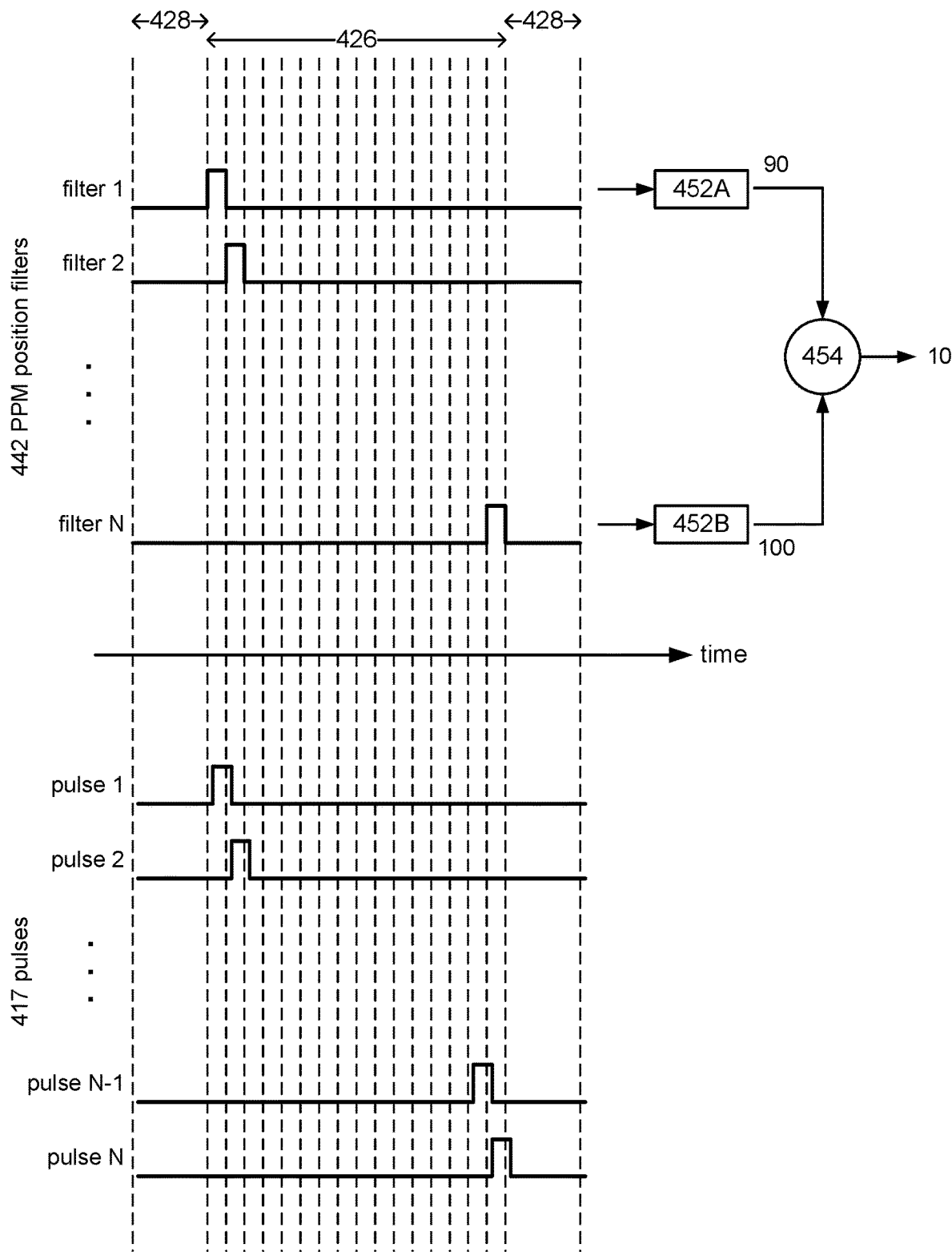
Figure 4C:
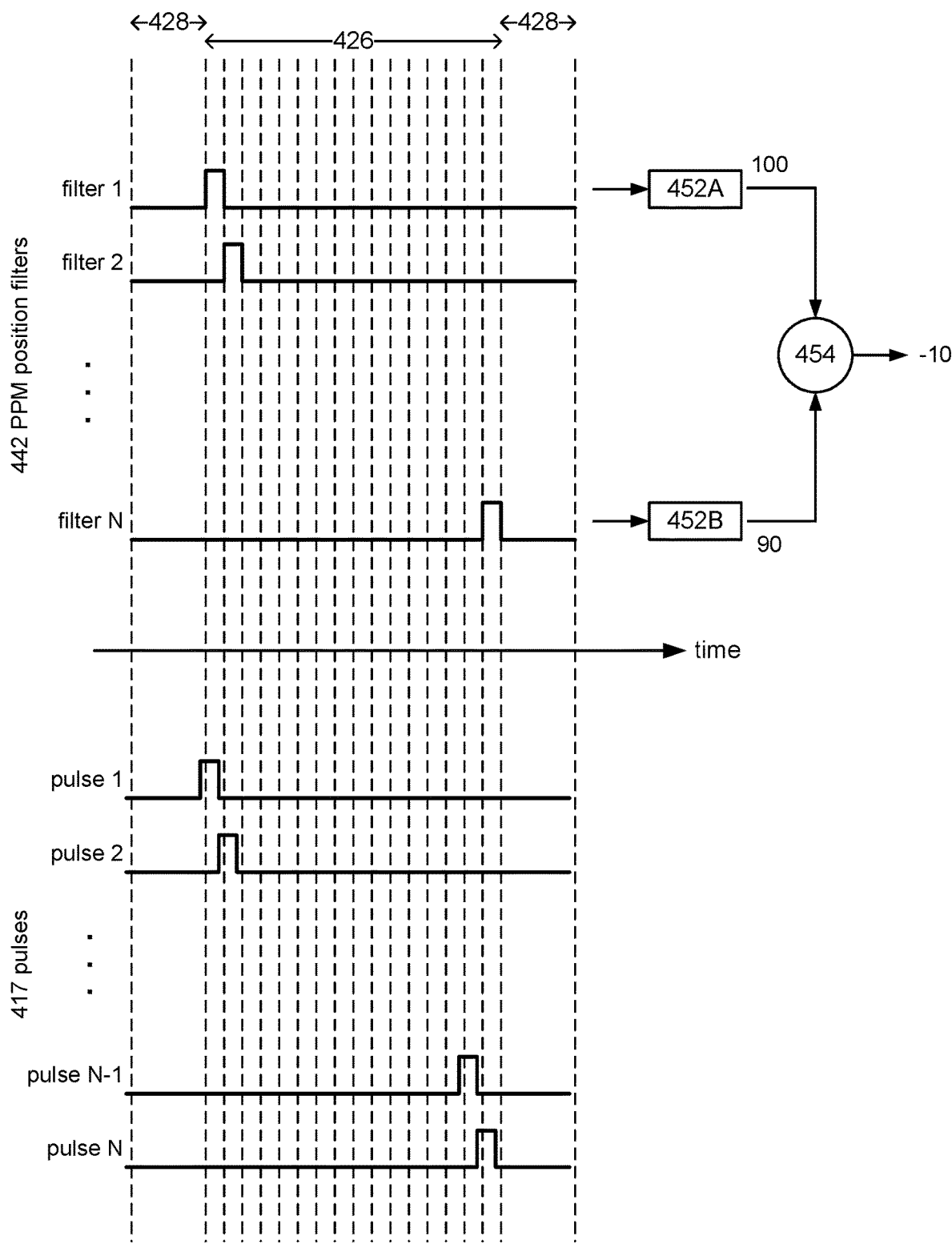

FIGS. 4A-4C are timing diagrams that illustrate timing synchronization using the approach shown in FIG. 3. In these figures, the x-axis is time as referenced to the receiver's local clock. The dashed vertical lines show the temporal location of the time slots according to the receiver (i.e., the receiver data slots). In this example, there are sixteen data slots 426 and four guard slots 428. The top half of the diagram shows the temporal locations of the PPM position filters 442, which are step functions in this example. Filter 1 is a step function that integrates the received PPM-modulated signal over receiver data slot 1. Filter N is a step function that integrates the received PPM-modulated signal over receiver data slot N.

The bottom half of the diagram shows the temporal location of pulses 417 that occupy the time slots in the received PPM-modulated signal. For illustration, the pulses 417 are shown as square pulses. Pulse 1 is the location of the pulse when the TX terminal encodes a symbol into signal data slot 1. Pulse N is the location of the pulse when the TX terminal encodes a symbol into signal data slot N.

The output of each PPM position filter 442 in the PPM filter bank depends on the overlap between that filter and the incoming pulse 417. Accumulator 452A accumulates the output of filter 1 and accumulator 452B accumulates the output of filter N. The accumulators 452A and 452B accumulate the filter outputs over multiple pulses. For this example, we assume that all pulses 417 are equally likely and the accumulators 452A and 452B operate over enough pulses to mitigate any statistical variation in the distribution of pulses. We also assume that no energy is transmitted during the guard slots 428.

The temporal locations of the pulses 417 may be offset relative to the temporal location of the corresponding filters 442. In FIG. 4A, the pulses are synchronized to the filter locations. Filter 1 is temporally aligned to the pulse 1's (i.e., pulses located in signal data slot 1) and filter N is also temporally aligned to the pulse N's. Over the accumulation time, accumulators 452A and 452B will output the same strength signal and the difference will be zero. For illustration, the accumulator outputs are shown as 100 and 100, and the difference as 100−100=0.

In FIG. 4B, the local clock at the receiver leads the timing of the pulses in the received signal. As a result, the filters 442 are ahead of the pulses 417 and the two do not fully overlap. Filter 1 now captures only part of pulse 1 due to the timing offset. The output of filter 1 is reduced, and so is the output of accumulator 452A. In FIG. 4B, the output of accumulator 452A is shown as 90. Filter N is also offset relative to pulse N and captures only part of pulse N due to the timing offset. However, pulse N−1 is pushed into receiver data slot N, so filter N also captures part of pulse N−1. As a result, filter N still outputs a full strength output, and the output of accumulator 452B is shown as 100. The difference is then 100−90=10.

FIG. 4C shows the reverse situation, where the local clock lags the received signal. Filter 1 now captures part of pulse 1 and part of pulse 2, for a full strength accumulator 452A output of 100. Filter N captures only part of pulse N, for a reduced accumulator 452B output of 90. The reduction in filter output is because the timing offset causes the guard slot to overlap with the end filters 1 and N. The difference is 90−100=−10.

Figure 5:
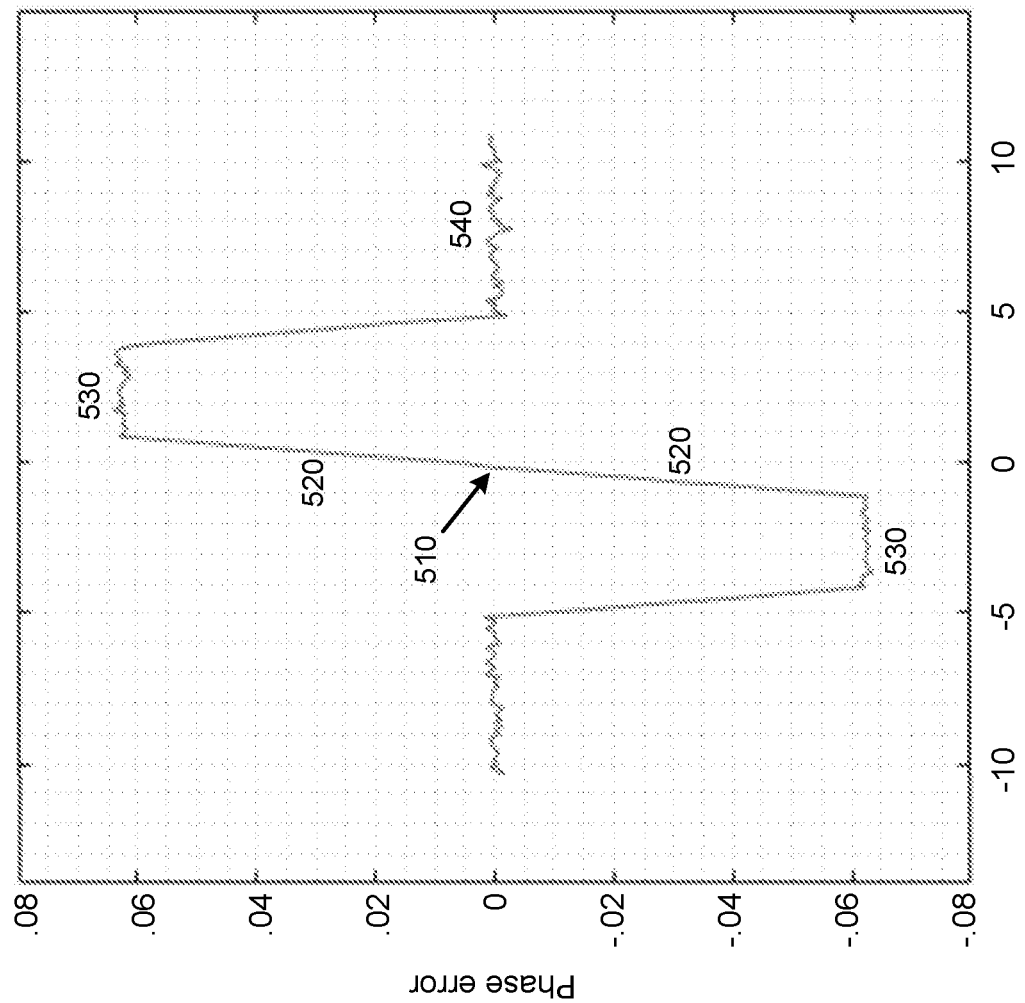
FIG. 5 plots phase error as a function of timing offset for the embodiment of FIG. 3.

The difference output is a measure of the phase error between the receiver and the received signal. FIG. 5 plots this phase error as a function of timing offset. This phase error is periodic, and FIG. 5 shows one period. The x-axis is the timing offset between the receiver and the received signal, measured in units of time slots. The y-axis is the phase error, measured as a fraction of the time interval occupied by data slots. That is, phase error=1 corresponds to a phase error equal to 16 time slots. At 0 timing offset (point 510), the phase detector outputs 0 phase error. The receiver and incoming signal are synchronized. Timing should be adjusted to stay locked at this point. Within a local vicinity of this point, there is a linear region 520 where the phase error output by the phase detector is linear as a function of timing offset. In this example, the linear region 520 is for timing offsets that are within +/−1 time slots of the lock point 510. For larger timing offsets (offsets of 1-5 time slots in this example), there is a region 530 where the phase detector produces an error signal of the correct sign but not proportional to the amount of timing offset. Beyond this lies a dead zone 540. Other mechanisms, such as the coarse tuning mechanism, may be used to get out of the dead zone.

Other implementations may have result in different plots of phase error versus timing offset. For example, a comparator may be used instead of the different component 354 in FIG. 3. In that case, the phase error signal 355 will be binary, either +1 or −1 depending on which accumulated signal 352A or 352B is larger. This type of output may be used for bang-bang control. As another example, more complex filtering or complex control may be applied to the phase error signal.

Figure 6:
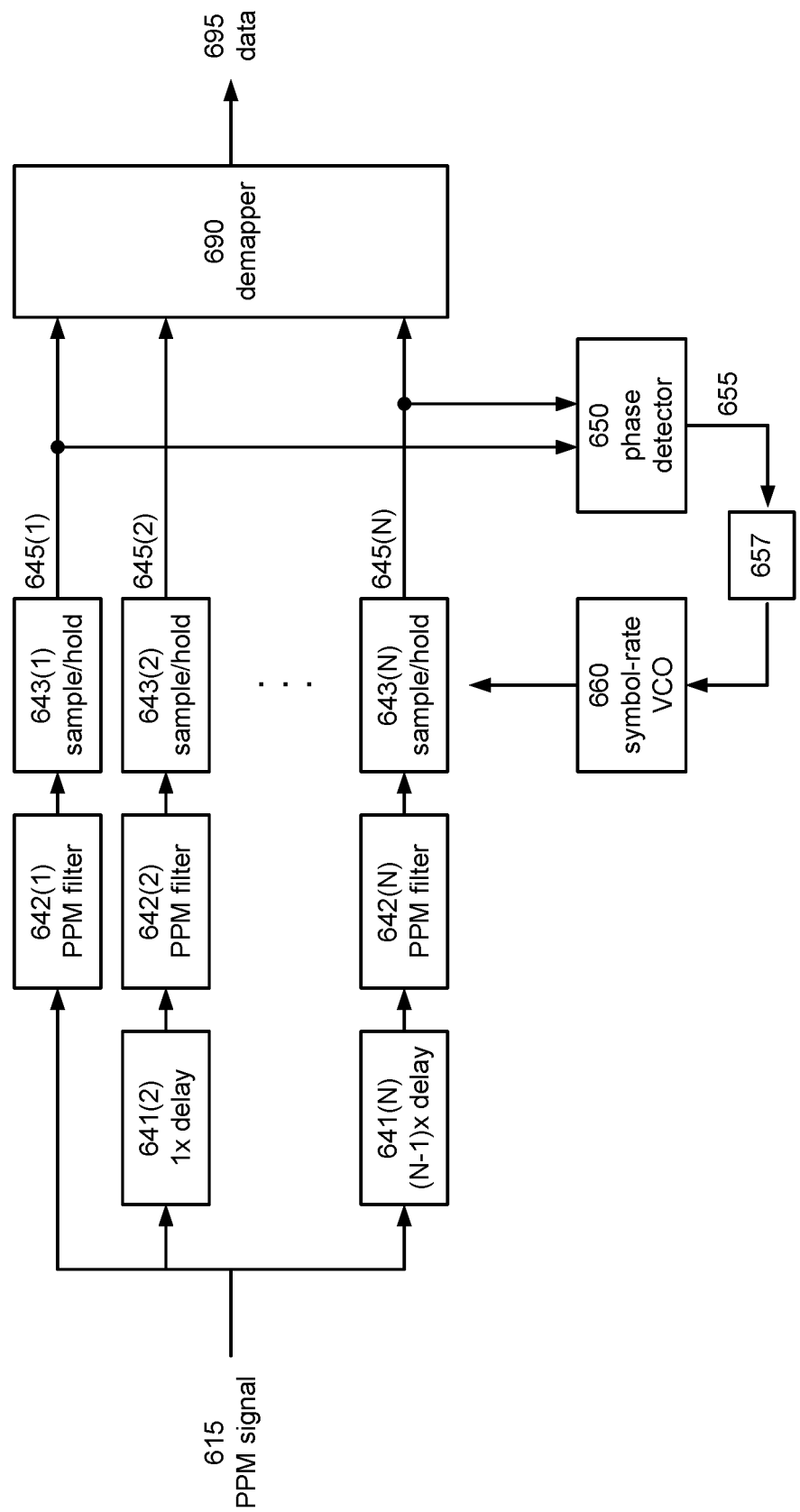
FIGS. 6-9 are block diagrams of different PPM receives using a phase detector, according to some embodiments.

FIGS. 6-9 show some alternate implementations of a PPM receiver using a phase detector. FIG. 6 is an analog implementation. The PPM-modulated signal 615 is split into N branches. Each branch includes a delay 641($n$), ranging from 0× the slot width to (N−1)× the slot width. In each branch, the delayed signal is filtered by the PPM position filter 642($n$) and then sampled by sample-and-hold circuitry 643($n$), which is driven by a VCO 660 operating at the symbol rate. Each branch outputs a slot detection signal 645($n$). The phase detector 650 accumulates the slot detection signals 645(1) and 645(N) for receiver data slots 1 and N, respectively. It outputs the phase error signal 655, which is filtered 657 and then adjusts the VCO 660. The demapper 690 converts symbols to bits 695.

Figure 7:
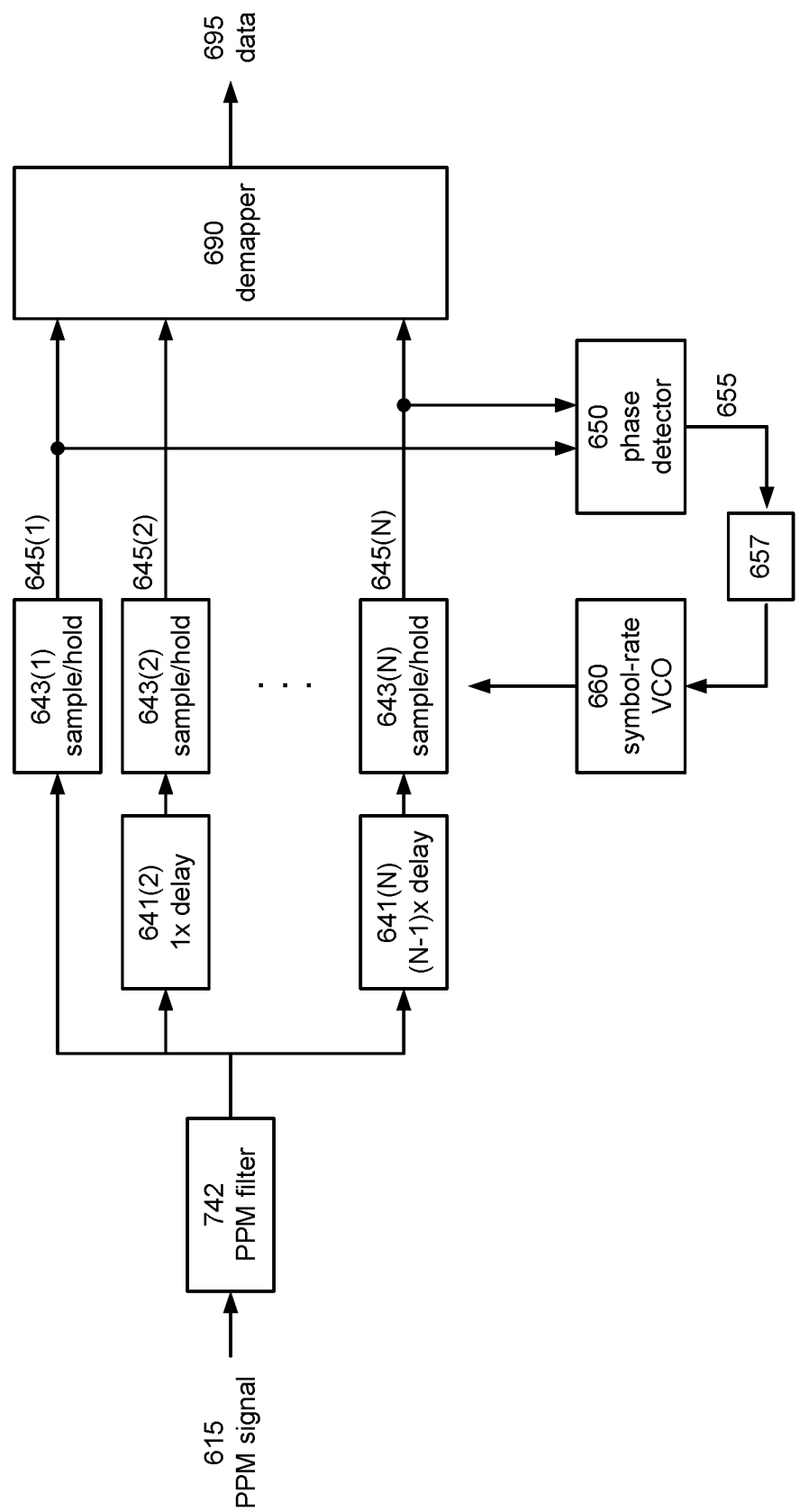

FIG. 7 shows an alternate implementation which is the same as FIG. 6, except that the N PPM position filters 642 are replaced by a single PPM position filter 742 located before the split into N branches.

Figure 8:
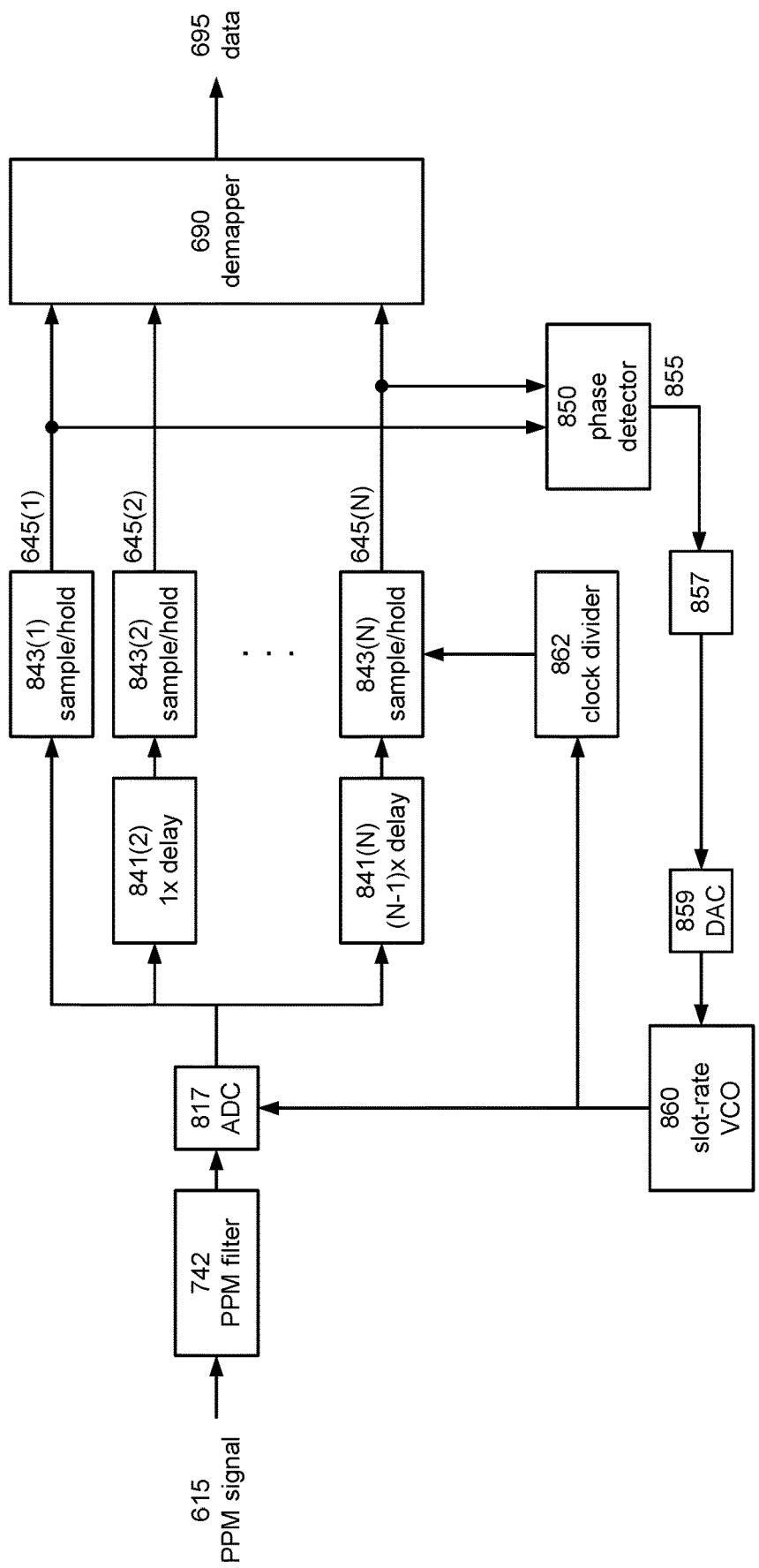

FIG. 8 is the same as FIG. 7, except that it is part digital. In the data path, A/D converter 817 converts the incoming signals from analog to digital. The delays 841 and sample-and-hold 843 are implemented digitally. In the feedback path, D/A converter 859 converts the signals from digital back to analog. The phase detector 850 is digital in this implementation, as is the phase error signal 855. The loop filter 857 could be either analog or digital. The VCO 860 is analog, but it operates at the slot rate, rather than the symbol rate, because it is timing the ADC 817. The timing signal from the VCO 860 is frequency divided 862 down to the symbol rate for the sample-and-hold circuits 843($n$).

Figure 9:
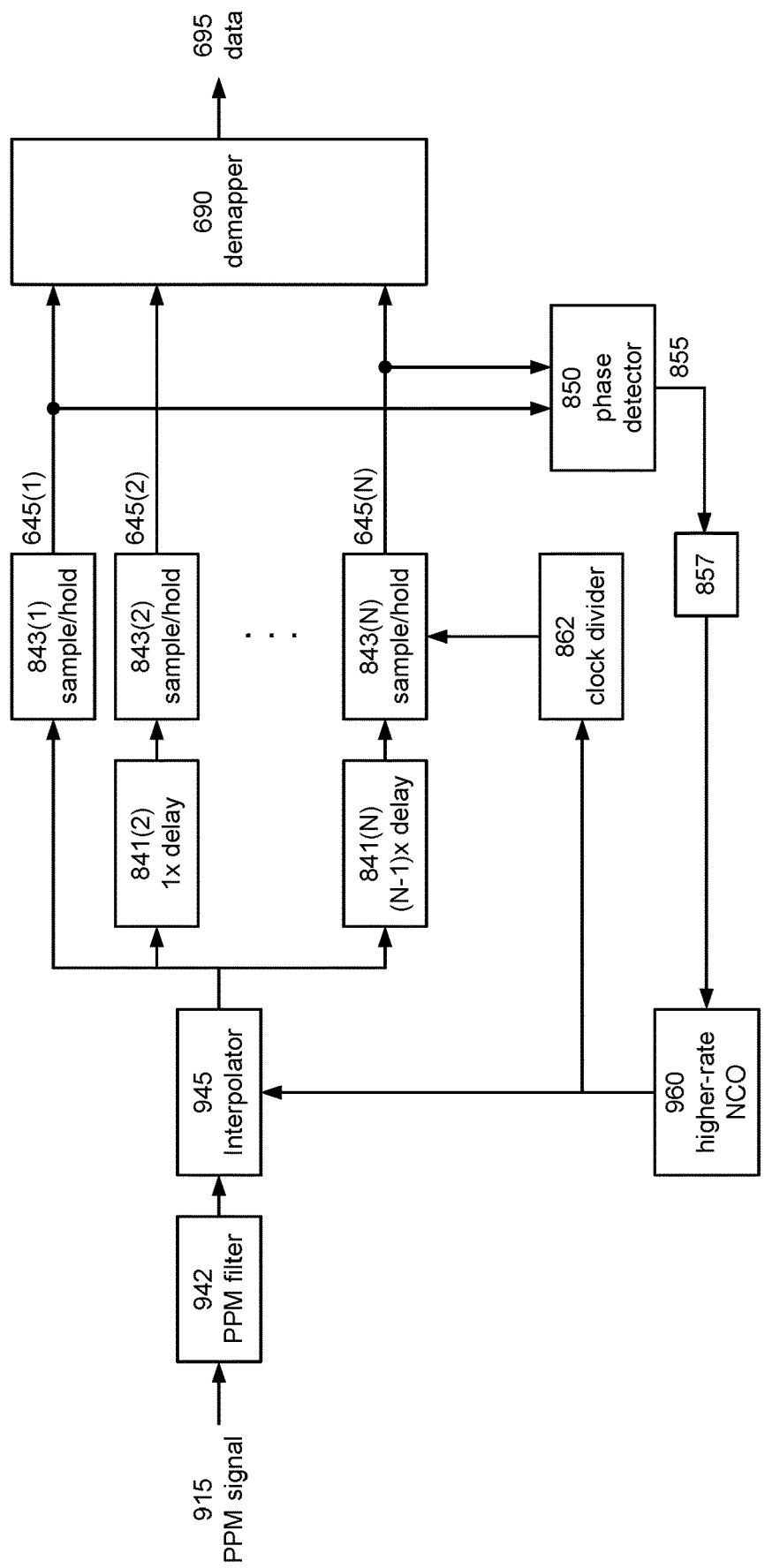

FIG. 9 shows a fully digital implementation. In FIG. 9, the incoming PPM-modulated signal 915 has already been converted to digital form, typically sampled at a rate that is higher than the slot rate, for example 4× or 8× the slot rate. The PPM position filter 942 and interpolator 945 are digital, as is the rest of the data path and feedback path. The VCO circuitry in other implementations is replaced by a numerically controlled oscillator (NCO) 960 operating at the same higher rate.

Figure 10:
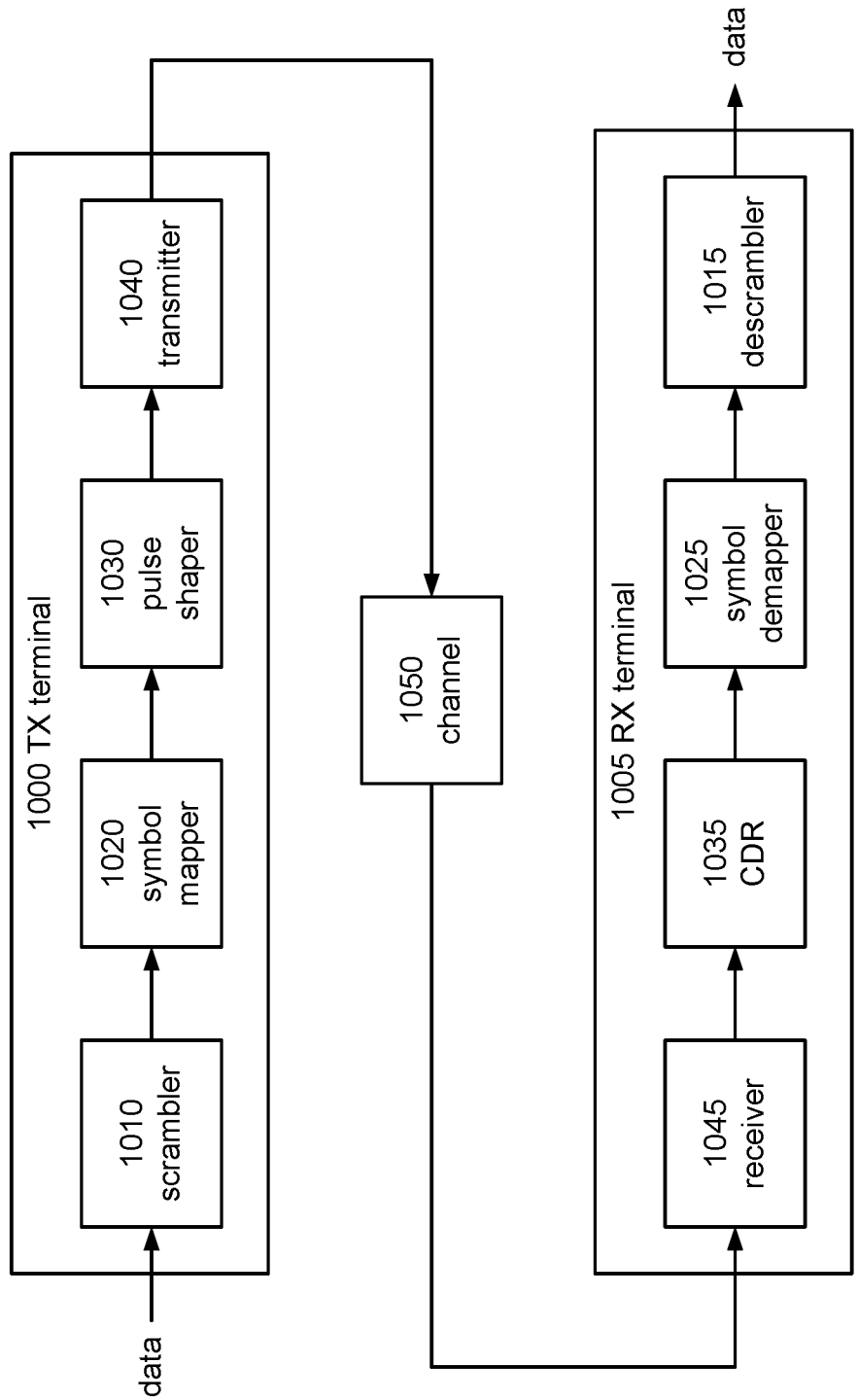
FIG. 10 is a block diagram of a communications link using PPM, according to some embodiments.

FIG. 10 is a block diagram of a communications link using PPM. As described previously, the phase detector described herein may be used in different types of PPM-modulated links. In FIG. 10, the transmitter terminal 1000 includes a scrambler 1010, symbol mapper 1020, pulse shaper 1030 and transmitter 1040. It may also have other components, such as forward error correction encoding. The scrambler 1010 scrambles the incoming data so that the transmitted symbols are approximately equally likely. The mapper 1020 maps the scrambled data to symbols. The pulse shaper 1030 creates the correct shape pulses for each symbol. The transmitter 1040 then transmits the PPM-modulated signal over the channel 1050 to the receiver terminal 1005, where the process is reversed. The receiver 1045 receives the PPM-modulated signal. CDR block 1035 includes most of what was described previously, including the PPM position filters and the phase detector based on slot detection signal. The demapper 1025 converts symbols back to bits and the descrambler 1015 unscrambles the bit stream.

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

The term "module" is not meant to be limited to a specific physical form. Depending on the specific application, modules can be implemented as hardware, firmware, software, and/or combinations of these. Furthermore, different modules can share common components or even be implemented by the same components. There may or may not be a clear boundary between different modules, even if drawn as separate elements in the figures.

Depending on the form of the modules, the "coupling" between modules may also take different forms. Dedicated circuitry can be coupled to each other by hardwiring or by accessing a common register or memory location, for example. Software "coupling" can occur by any number of ways to pass information between software components (or between software and hardware, if that is the case). The term "coupling" is meant to include all of these and is not meant to be limited to a hardwired permanent connection between two components. In addition, there may be intervening elements. For example, when two elements are described as being coupled to each other, this does not imply that the elements are directly coupled to each other, nor does it preclude the use of other elements between the two.

What is claimed is:

1. A pulse position modulation (PPM) receiver configured to recover symbols from an incoming PPM-modulated signals, wherein the PPM-modulated signal is based on a format comprising: (i) plural symbol periods with N data slots per symbol period, (ii) guard slots separating the data slots of different symbol periods, and (iii) the symbols encoded by positions of pulses within the data slots, and wherein the PPM receiver comprises:
   a local timing source that generates a local timing signal;
   a PPM slot detection module that receives the incoming PPM-modulated signal and outputs slot detection signals, wherein each slot detection signal is indicative of a presence of a pulse in a corresponding one of N receiver data slots, and wherein a temporal location of the receiver data slots is determined by the local timing signal; and
   a feedback path that adjusts a timing of the local timing signal based on a difference between (a) accumulated slot detection signals for receiver data slot 1, and (b) accumulated slot detection signals for receiver data slot N, wherein (a) and (b) are accumulated over a plurality of symbol periods.

2. The PPM receiver of claim 1, wherein the PPM receiver is part of a receiver terminal, and the PPM-modulated signal is derived from a free space optical beam transmitted from a transmitter terminal to the receiver terminal.

3. The PPM receiver of claim 1, wherein the feedback path comprises a phase detector that generates a phase error signal based on the difference between the accumulated slot detection signals, and the local timing signal is adjusted based on the phase error signal.

4. The PPM receiver of claim 3, wherein the local timing source comprises a voltage-controlled oscillator that is controlled by the phase error signal.

5. The PPM receiver of claim 3, wherein the local timing source comprises a numerically controlled oscillator that is controlled by the phase error signal.

6. The PPM receiver of claim 1, wherein the feedback path comprises:
   a first accumulator that accumulates the slot detection signals for receiver data slot 1;
   a second accumulator that accumulates the slot detection signals for receiver data slot N; and
   a difference component that generates the difference between the two accumulated slot detection signals.

7. The PPM receiver of claim 6, wherein the first and second accumulators and difference component comprise digital circuitry.

8. The PPM receiver of claim 1, wherein the PPM slot detection module comprises:
   a PPM filter bank comprising N temporal filters that correspond to the N receiver data slots, wherein the N temporal filters are applied to the incoming PPM-modulated signal to generate the N slot detection signals, and wherein a temporal location of the temporal filters is determined by the local timing signal.

9. The PPM receiver of claim 8, wherein the temporal filters are matched filters for the pulses within the data slots.

10. The PPM receiver of claim 1, further comprising:
    a coarse timing synchronization module that synchronizes symbol periods and data slots between the receiver and the incoming PPM-modulated signal.

11. The PPM receiver of claim 10, wherein the feedback path is characterized by a dead zone for timing offsets between the receiver data slots and the data slots in the PPM-modulated signal, and wherein the coarse timing synchronization module is used in the dead zone.

12. A method for recovering symbols from an incoming PPM-modulated signal, comprising:
    receiving an incoming PPM-modulated signal, wherein the PPM-modulated signal is based on a format comprising (i) symbol periods with N data slots per symbol period, (ii) guard slots separating the data slots of different symbol periods, and (iii) the symbols encoded by positions of pulses within the data slots;
    processing the incoming PPM-modulated signal to generate slot detection signals, wherein each slot detection signal is indicative of a presence of a pulse in a corresponding one of N receiver data slots, and wherein a temporal location of the receiver data slots is determined by a local timing signal; and
    generating a timing correction signal based on a difference between (a) accumulated slot detection signals for receiver data slot 1, and (b) accumulated slot detection signals for receiver data slot N, wherein (a) and (b) are accumulated over a plurality of symbol periods.

13. The method of claim 12, wherein generating the timing correction signal comprises generating a phase error signal based on the difference between the accumulated slot detection signals, and wherein adjusting the local timing signal is based on the phase error signal.

14. The method of claim 13, wherein the phase error signal is linear as a function of a timing offset between the receiver data slots and the data slots in the PPM-modulated signal for timing offsets that are less than +/−1 data slot.

15. The method of claim 13, wherein the phase error signal is generated over a range of timing offsets that is greater than +/−1 data slot.

16. The method of claim 12, wherein the local timing signal is adjusted every symbol period, and wherein the adjustment is based on slot detection signals accumulated over many symbol periods.

17. The method of claim 12, further comprising:
    adjusting an accumulation period over which the detection signals for data slots 1 and N are accumulated as a function of a characteristic of the incoming PPM-modulated signal.

18. The method of claim 12, further comprising:
    determining a temporal location of the guard slots based on the temporal location of the receiver data slots.

19. The method of claim 12, further comprising:
    recovering the symbols from the slot detection signals.

20. A method for controlling timing in a PPM receiver, the method comprising:
    accumulating slot detection signals derived from a PPM-modulated signal for (a) a receiver data slot 1 and (b) a receiver data slot N, wherein each slot detection signal indicates a presence of a pulse in a corresponding one of N receiver data slots; and
    generating a phase error signal based on a difference between (a) the accumulated slot detection signals for receiver data slot 1, and (b) the accumulated slot detection signal for receiver data slot N, wherein (a) and (b) are accumulated over a plurality of symbol periods.

\* \* \* \* \*